(12) United States Patent
Kawashima et al.

(10) Patent No.: US 11,443,720 B2
(45) Date of Patent: Sep. 13, 2022

(54) DISPLAY CONTROL APPARATUS, DISPLAY CONTROL METHOD, AND COMPUTER-READABLE STORAGE MEDIUM

(71) Applicant: DENSO CORPORATION, Kariya (JP)

(72) Inventors: Daiki Kawashima, Kariya (JP); Shigeo Kato, Kariya (JP); Kentaro Teshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/121,628

(22) Filed: Dec. 14, 2020

(65) Prior Publication Data

US 2021/0097963 A1    Apr. 1, 2021

Related U.S. Application Data

(63) Continuation of application No. PCT/JP2019/018553, filed on May 9, 2019.

(30) Foreign Application Priority Data

Jun. 28, 2018   (JP) .............................. JP2018-123176

(51) Int. Cl.
   *G09G 5/38*    (2006.01)
   *B60K 35/00*    (2006.01)

(52) U.S. Cl.
   CPC ............... *G09G 5/38* (2013.01); *B60K 35/00* (2013.01); *B60K 2370/1529* (2019.05); *B60K 2370/166* (2019.05); *B60K 2370/167* (2019.05); *B60K 2370/176* (2019.05); *B60K 2370/182* (2019.05); *G09G 2354/00* (2013.01); *G09G 2380/10* (2013.01)

(58) Field of Classification Search
   CPC .............................. G09G 5/38; G09G 2354/00
   See application file for complete search history.

(56) References Cited

U.S. PATENT DOCUMENTS

| | | | | |
|---|---|---|---|---|
| 2001/0047435 A1* | 11/2001 | Dove | ....................... | G09G 5/14 719/310 |
| 2012/0215404 A1* | 8/2012 | Sugiyama | ................. | G06F 5/00 701/36 |
| 2014/0114531 A1 | 4/2014 | Sugiyama et al. | | |
| 2014/0152433 A1 | 6/2014 | Sugiyama et al. | | |
| 2014/0327533 A1 | 11/2014 | Ueda et al. | | |
| 2017/0106752 A1* | 4/2017 | Sasaki | ..................... | B60K 35/00 |

FOREIGN PATENT DOCUMENTS

| | | | |
|---|---|---|---|
| JP | 2012190440 A | 10/2012 | |
| JP | 2014063458 A | 4/2014 | |
| JP | 5742799 B2 | 7/2015 | |
| JP | 2016013743 A | 1/2016 | |

* cited by examiner

*Primary Examiner* — Samantha (Yuehan) Wang
(74) *Attorney, Agent, or Firm* — Harness, Dickey & Pierce, P.L.C.

(57) ABSTRACT

An application issues a display request to display a content in an area set on a display device. In response to determining that a different content is displayed in the area, an arbitration is executed to allocate the content to the area to satisfy a rule-based arbitration using a rule definition including (i) an arbitration policy defining a basic arbitration when allocating the content to the area on the display device and (ii) a constraint expression describing a property to be exceptionally satisfied.

14 Claims, 15 Drawing Sheets

FIG. 7

| P | Q | P→Q |
|---|---|---|
| True | True | True |
| True | False | False |
| False | True | True |
| False | False | True |

| P | Q | | P→Q |
|---|---|---|---|
| False | True | EITHER RESULTING IN True | True |
| False | False | | True |

FIG. 11

DEFINITION:
  AREA A ENABLED TO DISPLAY CONTENT a1: POST-WIN
  AREA B ENABLED TO DISPLAY CONTENT b1: POST-WIN

PRIORITY BETWEEN AREAS:
      AREA A > AREA B

CONSTRAINT EXPRESSION:
  b1.isVisible() -> ! a1.isVisible()

a1 IN AREA A WITH HIGHER PRIORITY BEING DETERMINED FIRST

APP REQUEST:
  a1 BEING TURNED ON
  b1 BEING TURNED ON

RESULT →

INTERPRETED LOGICALLY AS IT IS:
a1 DISPLAYED
b1 NOT DISPLAYED

INTERPRETED AS INTENDED BY WRITER:
a1 NOT DISPLAYED
b1 DISPLAYED

DISPLAY CONTROL APPARATUS, DISPLAY CONTROL METHOD, AND COMPUTER-READABLE STORAGE MEDIUM

CROSS REFERENCE TO RELATED APPLICATIONS

The present application is a continuation application of International Patent Application No. PCT/JP2019/018553 filed on May 9, 2019, which designated the U.S. and claims the benefit of priority of Japanese Patent Application No. 2018-123176 filed on Jun. 28, 2018. The entire disclosures of both applications are incorporated herein by reference.

TECHNICAL FIELD

The present disclosure relates to a display control apparatus, a display control method, and a computer-readable storage medium.

BACKGROUND

For example, the contents displayed on a display device installed in a vehicle is diverse. Examples of these contents include traveling system contents related to vehicle traveling and multimedia contents not related to the vehicle traveling. For example, traveling system contents related to vehicle traveling include vehicle speed, engine speed, shift position, and remaining amount of fuel. For example, multimedia contents include map information for navigation, audio information, and mobile phones.

Due to diversification of the displayed contents, various display devices for displaying the contents are mounted in vehicles. The various display devices include, for example, a head-up display, a graphic meter, a center display placed on a center console, or the like.

The content is displayed in a predetermined area on the display device in response to a display request from an application.

SUMMARY

According to an example of the present disclosure, an application issues a display request to display a content in an area set on a display device. In response to determining that a different content is displayed in the area, an arbitration is executed to allocate the content to the area to satisfy a rule-based arbitration using a rule definition including (i) an arbitration policy defining a basic arbitration when allocating the content to the area on the display device and (ii) a constraint expression describing a property to be exceptionally satisfied.

BRIEF DESCRIPTION OF THE DRAWINGS

The objects, features, and advantages of the present disclosure will become more apparent from the following detailed description made with reference to the accompanying drawings. In the drawings:

FIG. 7 is a diagram showing a definition of a truth value;

FIG. 11 is a diagram showing an example in which the constraint expression is different from the intention of a writer;

DETAILED DESCRIPTION

Figure 2:
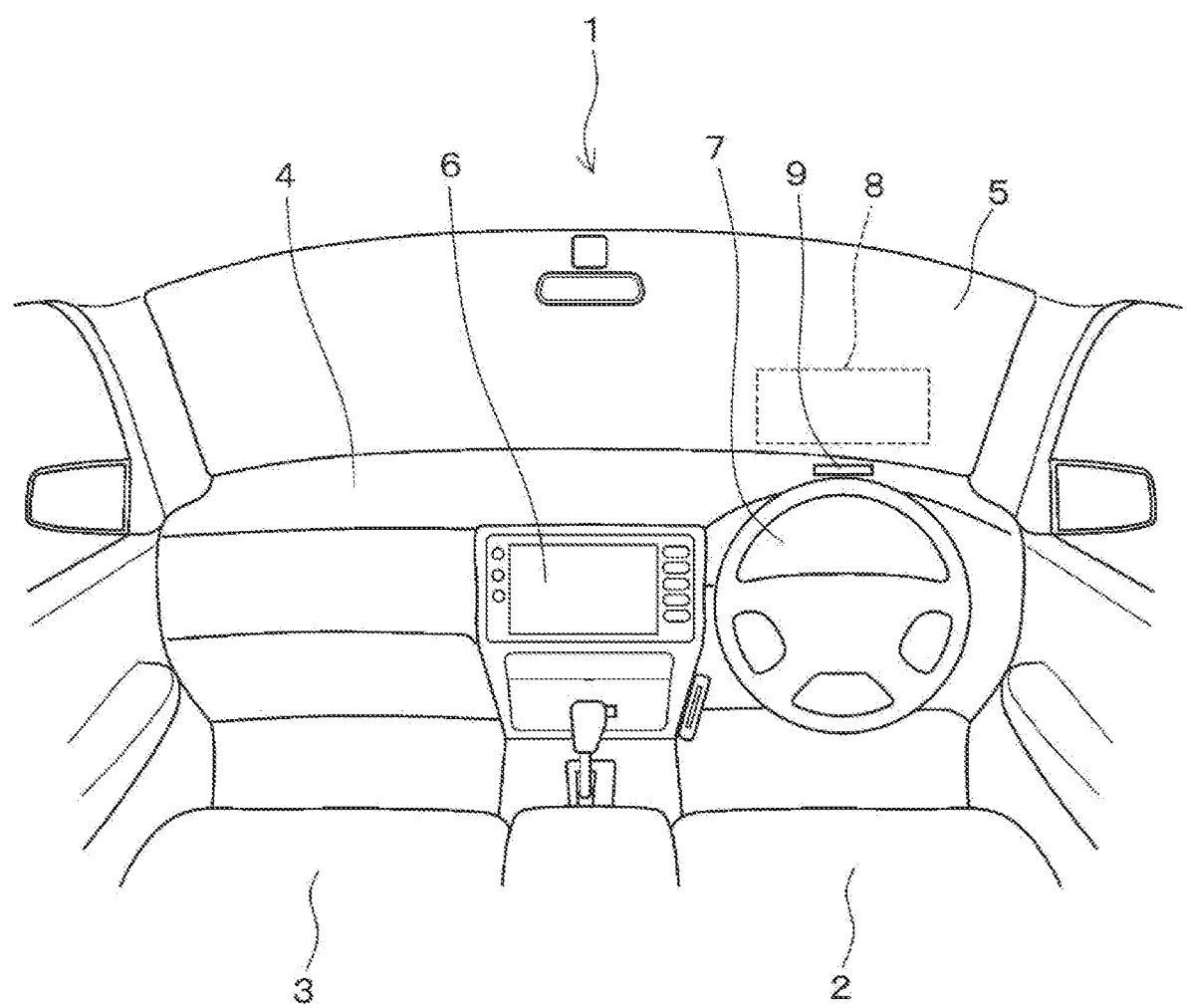
FIG. 2 is a perspective view showing a front portion of a vehicle interior of a vehicle.

Hereinafter, an embodiment of the present disclosure will be described with reference to the drawings. As shown in FIG. 2, in a vehicle 1, a driver's seat 2 and a passenger's seat 3 are provided; an instrument panel 4 is provided in front of the seats 2, 3. A windshield 5 is provided upright from the front end of the instrument panel 4. The instrument panel 4 is provided with a first display device 6 and a second display device 7; the windshield 5 is provided with a third display device 8.

The first display device 6 includes a full-color liquid crystal display device, and mainly functions as a display device, for multimedia contents, such as a navigation device and an audio device (not shown) mounted on the vehicle 1. When the vehicle is moving backward, an image captured by a rear camera (not shown) is displayed as a content.

The second display device 7 includes a full-color liquid crystal display device, and mainly functions as a display device for displaying the content of the traveling system such as the speed of the vehicle or the rotation speed of the engine.

The third display device 8 is configured as a head-up display by projecting from the display unit 9 provided on the instrument panel 4 onto the windshield 5, and mainly functions as a display device that displays the content of the traveling system. One or a plurality of areas for displaying contents are set in each of the display devices 6 to 8.

Figure 1:
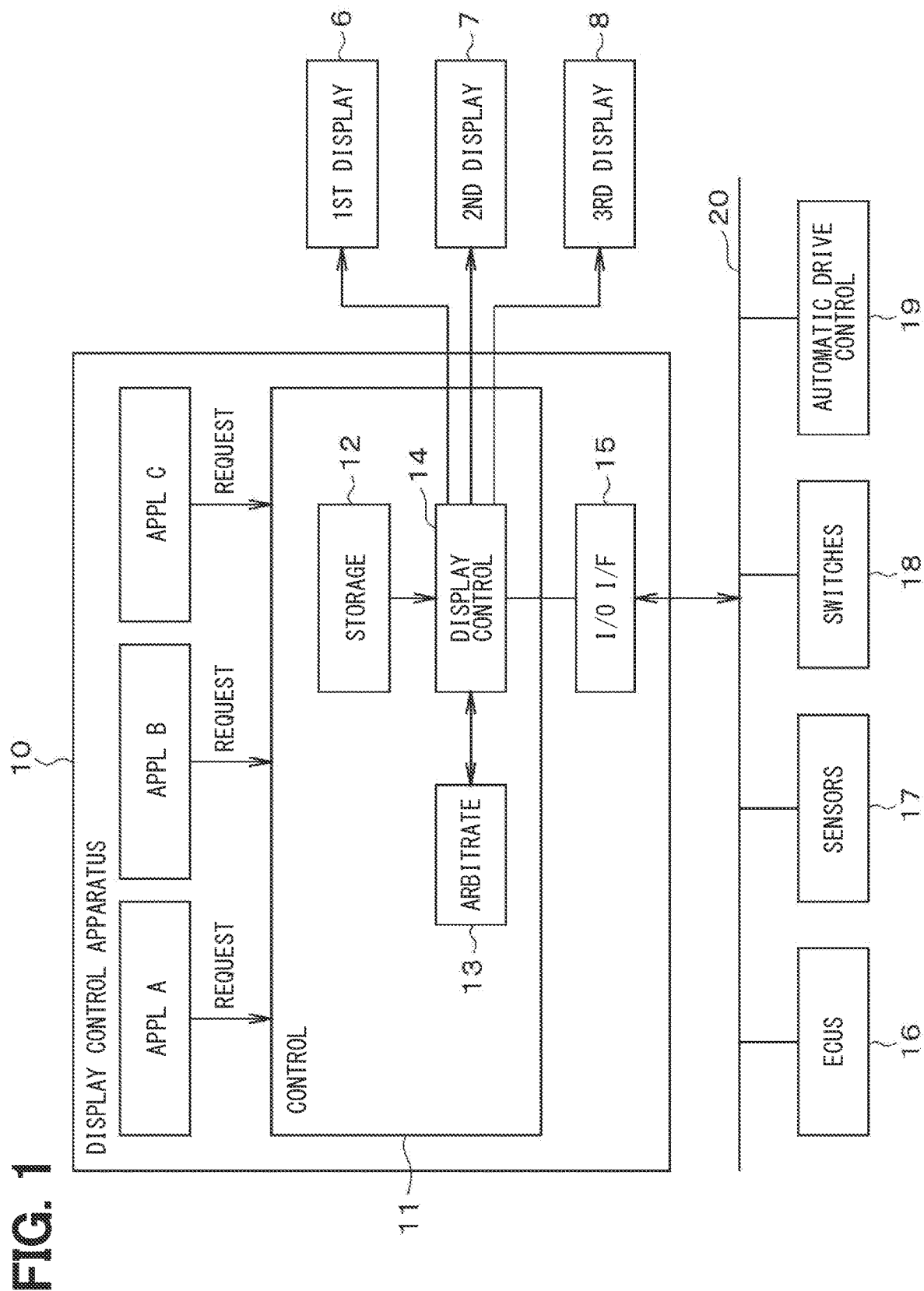
FIG. 1 is a functional block diagram showing a configuration of a display control apparatus according to an embodiment.

The display control apparatus 10 shown in FIG. 1 displays contents in the areas set on the display devices 6 to 8. The display control apparatus 10 includes a microcomputer including a CPU (Central Processing unit), a ROM (Read Only Memory), a RAM (Random Access Memory), an I/O (Input/Output) interface, etc., which are connected with each other via a communication link as shown in FIG. 1, and executes a display control program stored in a non-transitory tangible storage medium.

The display control apparatus 10 stores a plurality of applications A to C in a storage such as the ROM or the like in advance. When each application A to C intends to display a content in a predetermined area of one or more display devices 6 to 8, an APP (application) request (corresponding to a display request) indicating the display device, the area, and the content is output as an interrupt to the controller circuit 11.

The controller circuit 11 includes a storage 12, an arbitration unit 13, and a display controller unit 14. The controller circuit 11 may be included as the CPU, the ROM, the RAM, or the like in the above mentioned microcomputer. All or part of each of the arbitration unit 13, and the display controller unit 14 may be implemented by the controller circuit 11 or the CPU executing a program stored in the ROM or the like, or implemented by a special-purpose hardware circuitry included in the controller circuit 11.

The storage 12, which may be the ROM or the like in the above-mentioned microcomputer, stores a rule definition (which may also be referred to as a rule-based definition). The rule definition includes (i) an arbitration policy that defines basic arbitration when allocating contents to areas, and (ii) a constraint expression being a rule that describes properties that should be exceptionally satisfied.

The arbitration policy is always set by any one of (i) priority arbitration (corresponding to value arbitration), (ii) post-win arbitration, and (iii) value-based arbitration, as described later. The constraint expression is not limited to one. Any one may not be provided depending on the intention of the writer. A plurality of constraint expressions may be provided.

The arbitration unit 13 arbitrates a content allocated to an area based on the rule definition. The display controller unit 14 is connected to various ECUs 16, various sensors 17, various switches 18, automatic driving devices 19 and the like via an input/output I/F 15 by an in-vehicle network 20 such as CAN (Controller Area Network). The display controller unit 14 displays the content allocated by the arbitration unit 13 in a predetermined area. The arbitration logic can be created as a library, and a rule-based arbitration can be set optionally by registering/changing the rule definition in the library.

By the way, when allocating a content to an area, a different application may issue an APP request simultaneously. In such a case, arbitration is required. Note that "simultaneous" does not mean simultaneous in time. It means that the content of another application is already displayed when an application issues an APP request. That is, it means a state in which the APP requests from two applications have already been turned ON.

When the APP requests are simultaneously turned on in this way, it is necessary to arbitrate the content displayed in the area. A known technique defines all the behaviors of which content is displayed in which area. However, with a large number of contents, it becomes difficult to define all the behaviors.

Under such circumstances, the present embodiment adopts a rule-based arbitration that abstractly represents which content is displayed in which area. The rule-based arbitration will be described below.

1. Rule-Based Arbitration (1) Rule Definition

The rule-based arbitration describes an arbitration method that arbitrates a content based on a given fixed rule and allocates the content to an area. The rule definition in the rule-based arbitration needs an area definition, a content definition, and a constraint expression.

(1-1) Area Definition

The area definition defines a display location, a value of a display location, and an arbitration policy. Since an arbitration is performed for each area, an arbitration policy is defined for each area. An area is defined as a frame for displaying a content on the display screen of each of the display devices 6 to 8. At most one content is allocated to one area.

An area is defined as follows.
(a) An area displays an allocated content.
(b) An area has an arbitration policy.
(c) An area refers to the content that can be displayed.
(d) An area has one or more sizes.

Each area has properties. As the properties, priority, Z order, arbitration policy, and size are set.

(a) Priority

The priority is a value (0 to 100%) indicating the value of the area itself. Arbitration is performed in order from the area with the largest value.

(b) Z Order

The Z order is a coordinate related to a height. The higher this value is, the more it is displayed on the front. If there are areas with the same priority, arbitration is performed in the descending order of this value.

(c) Arbitration Policy

The arbitration policy is one of (i) priority arbitration (ii) post-win arbitration, and (iii) value-based arbitration.

(c-1) Priority Arbitration

Figure 3:
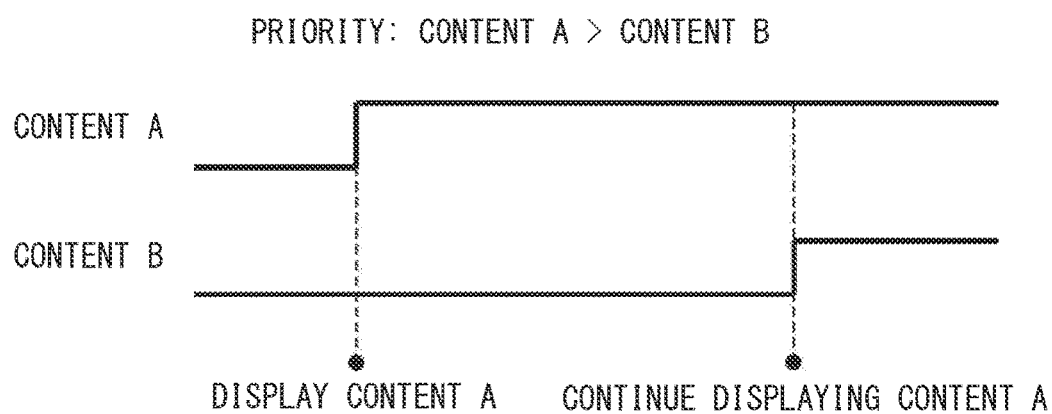
FIG. 3 is a diagram showing priority arbitration.

The priority arbitration is an arbitration policy for each area. The priority arbitration displays the highest priority content among the contents that can be displayed in the area as shown in FIG. 3.

(c-2) Post-Win Arbitration

Figure 4:
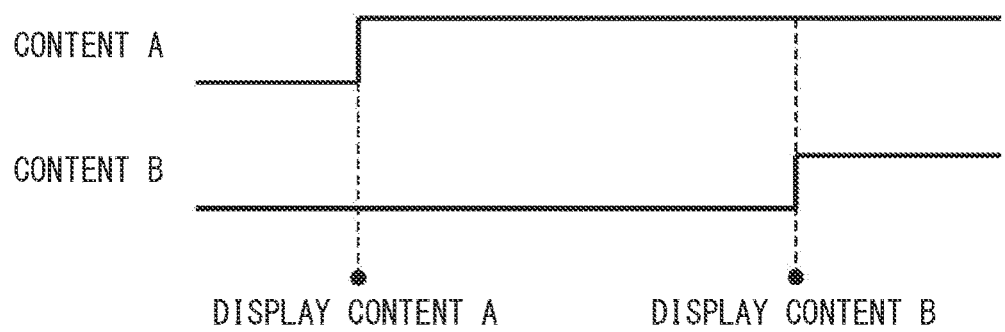
FIG. 4 is a diagram showing post-win arbitration.

The post-win arbitration (which may also be referred to as a last-come-first-served arbitration) is an arbitration policy for each area. In the post-win arbitration, the last requested content is displayed in the area. When the display of the last requested content is finished, the last requested content among the remaining contents is displayed, as shown in FIG. 4.

(c-3) Value-Based Arbitration

A value-based arbitration is an arbitration policy for all areas. The value-based arbitration displays the content with the maximum calculated value obtained by multiplying the numerical value of the value of the content and the numerical value of the value of the area.

(d) Size

Figure 5:
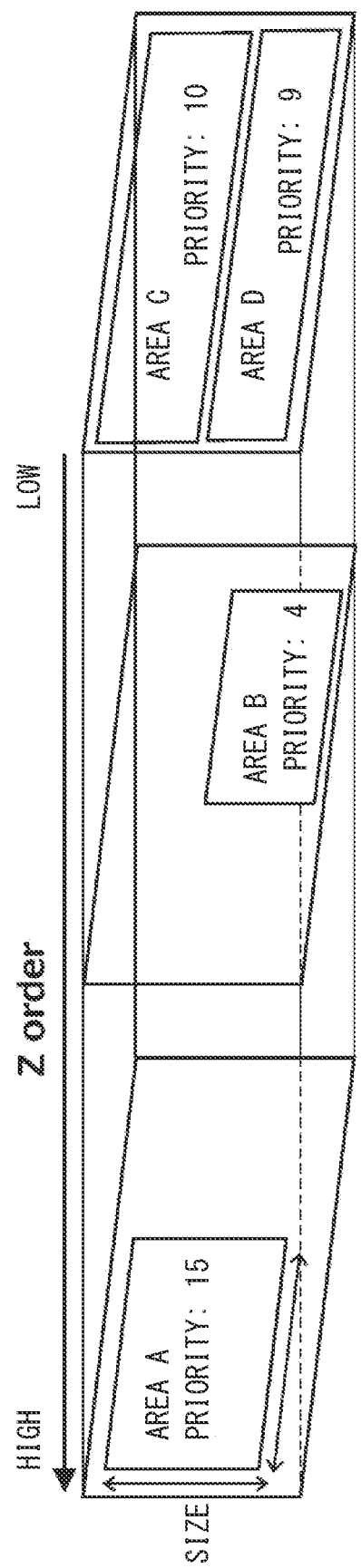
FIG. 5 is a diagram showing a relationship between priority and Z order in areas.

The size of the area is vertical×horizontal. If several sizes are defined, it is determined according to the size of the content. The relationship between the Z order of areas and the priority is as shown in FIG. 5.

(1-2) Content Definition

In the content definition, the displayable area, the content state, and the value of the content state are defined. A content can have a plurality of states. The content is allocated to an area. The state of the content is displayed. A content defines and refers to the area that the content by itself can be displayed.

A content is defined as a content to be displayed in an area defined on the display screens of the display devices 6 to 8. At most one content is allocated to one area.

The content is defined as follows.
(a) Content is allocated to an area.
(b) Content refers to one or more areas that can be displayed by itself.
(c) Content always has one or more states.
(d) Content has one or more sizes.

When a content has a plurality of displayable areas, the content can be displayed in each of the displayable areas; the content can be displayed in the plurality of areas at the same time. One content can have a plurality of states, which are exclusive from each other; the content is displayed in only one of the states at a time. The content can have a plurality of sizes; the content is displayed with the size most similar to the size of the displayed area among the plurality of sizes of the displayed areas.

Figure 6:
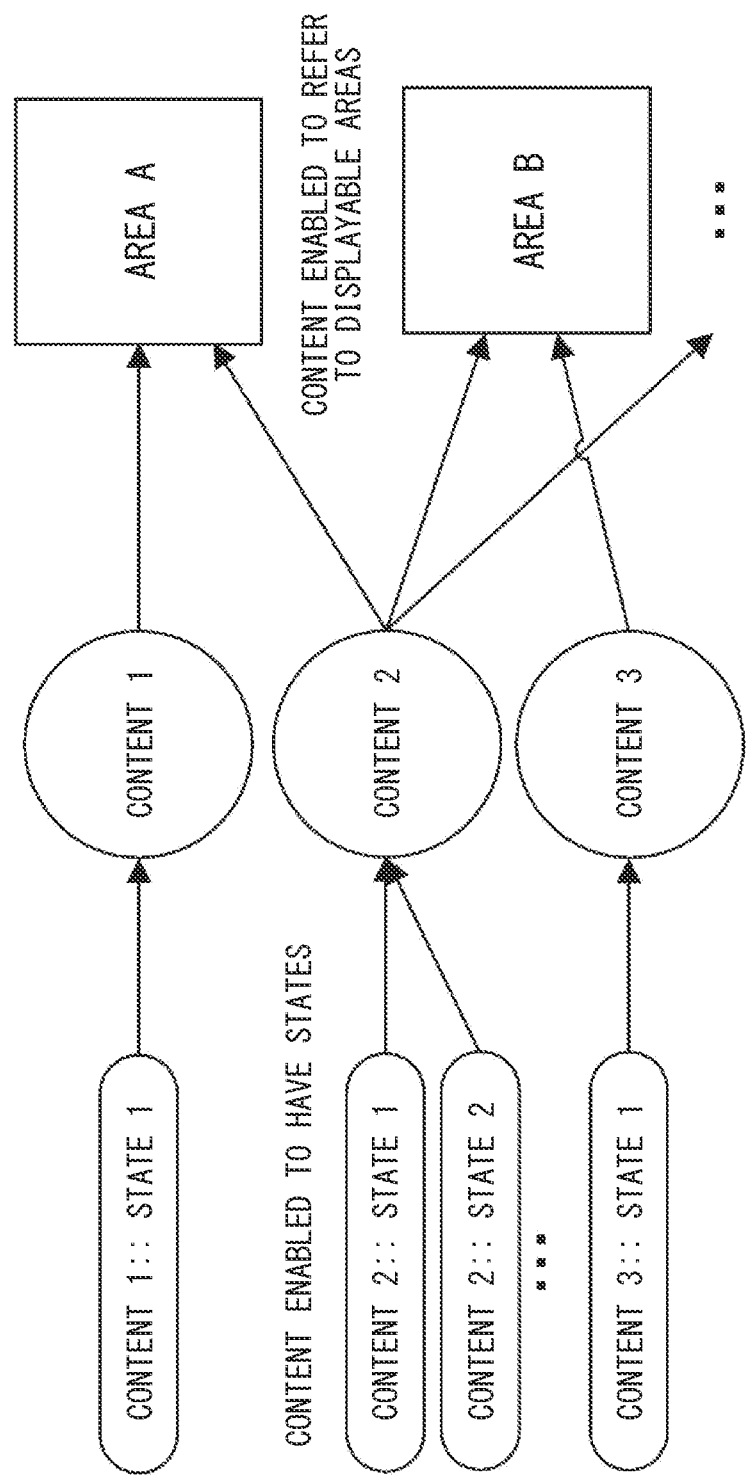
FIG. 6 is a diagram showing a relationship among content, state, and area.

The relationship among content, state and area is linked as shown in FIG. 6. The content has a property. The property sets (i) the priority and (ii) whether or not to withdraw the APP request when the size arbitration is lost (goodloser).

(a) Priority

The priority is a value used when the area arbitration policy is "priority arbitration"; the content with a high priority is allocated to the area first.

(b) Size

The size is a size of a content display, which is vertical× horizontal. If more than one size is defined, the size is determined according to the size of the area.

(1-3) Constraint Expression

The constraint expression is a rule that describes a property that should be exceptionally satisfied during or after the arbitration. By suppressing the state of arbitration with a constraint expression, it is possible to represent a state that cannot be expressed by the arbitration policy as it is, or to use it for determining whether to agree to the arbitration result after arbitration. That is, for example, depending on the situation such as the traveling state of the vehicle, it may be better not to display the content even if it is allocated by the arbitration policy. The constraint expression defines conditions for the arbitration result to be required to or supposed to satisfy the content suppression and/or area suppression.

The logical expressions that can be used in the constraint expression include a content state, an area state, a content being displayed in an area, a set of an area and a content, a scene state, a logical operation, and a quantification symbol. The scene is, for example, a manual driving scene or an automatic driving scene by the automatic driving device 19. For example, in the automatic driving scene, it is possible to perform a display control so as to prevent the contents for manual driving from being displayed.

(a) The content state is either active/inactive or being displayed/not being displayed.

(b) The area state is either being displaying or not being displaying.

(c) Logical operations are NOT (!), AND, OR, implication (->), and equal sign (=).

The quantification symbol includes ∀ (For all: the condition is satisfied for all elements of the set) and ∃ (Exists: at least one element satisfying the condition exists in the set).

(d) Constraint Expression

The constraint expression affects the result of the arbitration logic; the arbitration logic behaves so as to satisfy all the constraints.

(e) Post-Processing

Post-processing is a property (goodLoser) that defines waiting for an APP request after arbitration in a specific content. The post-processing does not affect the result of the arbitration logic because only the waiting state of the content after arbitration changes.

(1-4) Content Suppression

For example, "a central area.displayingContent( )= c1->!c2.isVisible( )" is exemplified as a constraint expression indicating that the content c2 is not displayed during the display of the content c1. This constraint expression describes suppression indicating that the content c2 is not displayed if the content c1 is displayed in the central area.

(1-5) Priority Arbitration and Post-Win Arbitration

When priority arbitration and post-win arbitration coexist, the arbitration policy of the area is first set to post-win. Then only the relationship between the contents related to the priority is described by the constraint expression.

An example of such a constraint expression is "TEL.isActive( )->ForAllMM interrupt (other than TEL) {x|!x.isVisible( )}". The arbitration policy is an area of post-win arbitration. Adding this constraint equation results in describing a suppression that all MM interrupts (other than TEL) are not displayed if TEL, which has a high priority, is active.

2. Arbitration Logic

The arbitration logic is an algorithm that defines a method of allocating content so as to satisfy a constraint expression based on an arbitration policy of an area based on a given rule. Basically, arbitration is performed in order of priority for each area. If the operator has a constraint expression defined by implication and the determination is different from the intention of the writer, the arbitration is performed again (i.e., a re-arbitration is performed) by returning to the previous area.

The arbitration logic includes arbitration within an area and arbitration for all areas.

(2-1) Arbitration within an Area (a) In the arbitration within an area, the areas of priority arbitration and post-win arbitration are arbitrated in descending order of priority.

(b) The following is evaluated for each area.

The content with the highest priority is provisionally allocated. Then, if the evaluation result of the constraint expression is true, the provisionally allocated content is fixed (i.e., settled). If the evaluation result of the constraint expression is false, the next priority content is re-evaluated. If there is no content that satisfies the constraint expression, no content is displayed in that area.

(2-2) Arbitration of all Areas

The arbitration (value-based arbitration) for all display areas includes best fit logic and one pass logic.

(a) The best fit logic is to select the combination of the content and area with the highest total value among all the combinations of the areas and contents satisfying the constraint expression.

(b) The one-pass logic is to allocate areas in order from the higher priority area with a higher priority content, while excluding the content already allocated to other areas. Although the one-pass logic is adopted in this embodiment, the best fit logic may be adopted.

(2-3) Implication in Constraint Expression

In the arbitration logic, "implication" in the constraint expression has a meaning as a condition for re-arbitration, so the implication will be described below.

The implication in propositional logic can be described as P->Q. The semantics is that the left side is the premise part, and the right side is the conclusion part. "If the premise is satisfied, the conclusion is satisfied." The definition of the truth value (truth table) is as shown in FIG. 7.

Figure 8:
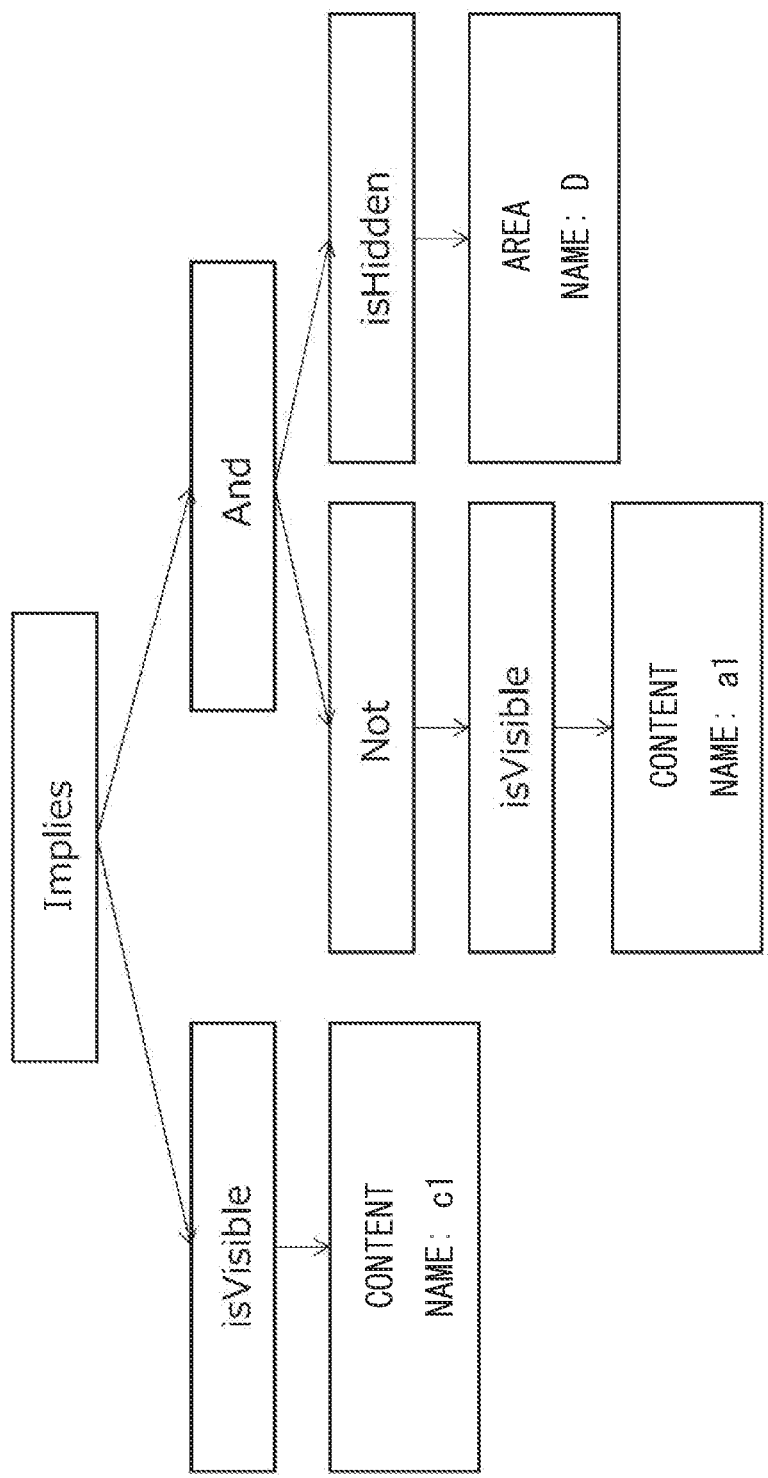
FIG. 8 is a diagram showing a data structure of a constraint expression object.

The axiom system of propositional logic is P->Q≡¬P∨Q. Further, the data structure of the constraint expression object is a syntax tree as shown in FIG. 8. Therefore, it is possible to determine the left and right sides of the implication.

(2-4) Difference in Implication Intention and Logical Value

P->Q is true when both P and Q are true. In other words, if P is false regardless of Q, the constraint expression is true.

Figures 9, 10:
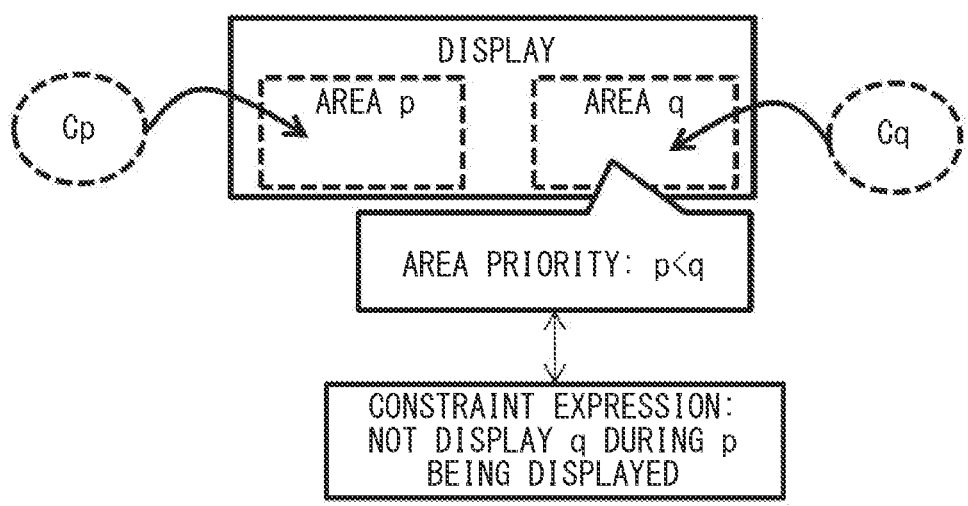
FIG. 9 is a diagram showing a truth value that makes an evaluation result true when the left side of the constraint expression is false.
FIG. 10 is a diagram showing a relationship between priority of areas and a constraint expression.

When the implication is used in the constraint expression, the writer often intends to "determine the right side after the left side is satisfied". In other words, the implicit intention is that there is an order, and the right side should be satisfied after the left side is satisfied. However, logically, if the left side becomes false after determining truth or false of the right side, the implication is true eventually regardless of whether the right side is truth or false. This is logical, that is, there is no problem in implication semantics. This means that, in order to satisfy the constraint expression in the arbitration logic, the constraint expression can be satisfied by forcibly making all the left sides of the implications false as shown in FIG. 9.

In one-pass logic, the content allocated to an area is fixed (i.e., settled) according to the priority order of the area. In other words, the left and right sides of the implications do not matter. On the other hand, the intention of the implication constraint expression is "when the right side is determined after the left side is satisfied"; thus, the left and right sides of the implication are related. The aim of re-arbitration is to solve this problem.

Next, the re-arbitration of the implication constraint expression will be described. It is assumed that there is a constraint expression P->Q, and as shown in FIG. 10, there are an area p related to P and an area q related to Q. The priority of the area is p<q. A specific example of the constraint expression is "p.isDisuplay( )->q.isHidden( )", and the meaning is "q is not displayed during p display".

The following will describes an arbitration logic when there are content Cp related to the area p and content Cq related to the area q and the APP requests are simultaneously generated.

(1) First, the content of the area q is determined by the one-pass logic. As a result, the content Cq is allocated to the area q. In this case, the evaluation of the constraint expression skips the area p because there is an unallocated area on the left side.

(2) The content of the next area, area p, is determined by the one-pass logic as follows. After provisionally allocating Cp to the area p, the constraint expression "p.isDisuplay( )->q.isHidden( )" is evaluated. In this case, since true->false, the evaluation result of the constraint expression becomes false. Since the implication right side (area q) has been arbitrated, the area q is re-arbitrated. Specifically, the content Cp allocation is correct, and the content allocation is redone in the area q.

(3) By re-arbitration, the content of the next area, area q, is determined as follows. When the content Cq is provisionally allocated to the area q, the condition becomes true->false. The evaluation result of the constraint expression becomes false. Therefore, the provisional allocation of the content Cq is released, and the allocation content of the area q ends without any content. As a result of the above operation, while the content Cp is being displayed in the area P, the content allocation in the area q is lost, and the intended result of the constraint expression is obtained.

The arbitration logic evaluates the constraint expression by arbitrating in order from the area with the highest priority. Therefore, the right side (conclusion part) of the implication may be determined first, and then the left side (premise part) of the implication may be determined depending on the way of describing the implication of the constraint expression and the high priority of the area. In all such cases, if the left side is made false, it is logically correct; however, a gap with the intention of the writer described above "after the left side is satisfied" occurs.

Such an example of this is shown in FIG. 11, as follows: area A can display content a1 with post-win; area B can display content b1 with post-win; the priority relationship between areas is area A>area B; and the constraint expression is b1.isVisible( )->!a1.isVisible.

When the APP requests are turned on in the order of the content a1 and the content b1, the content a1 will be displayed in the area A and then the content b1 will be displayed in the area B according to the arbitration policy of post-win. In this case, since the content a1 of the area A having a higher priority is determined first, the right side of the constraint expression is determined first, and the right side of the constraint expression becomes false first. In this case, if the left side of the constraint expression is forcibly set to false, the evaluation result of the constraint expression will be true. Therefore, if logically interpreted as it is, the content a1 is a display determination and the content b1 is a non-display determination.

However, the intention of the writer is to make a non-display determination of the content a1 after the content b1 has been made a display determination. Therefore, it does not reflect the intention of the writer. In other words, the arbitration logic should endlessly eliminate the gap between the writer's intention and the arbitration behavior. As a result, instead of sequentially applying arbitration from areas with higher priority in one-way traffic, a recursive arbitration logic is required to redo arbitration when the constraint expression goes into an unintended state as described above. For this reason, the recursive arbitration logic is adopted in this embodiment.

(2-5) Behavior

The recursive arbitration logic includes (i) an arbitration process that allocates content to an area and (ii) post-processing that changes the state of a request after the arbitration process. Also, all constraint expressions are evaluated in order to confirm whether the arbitration process has succeeded.

(a) Behavior of the Entire Arbitration Logic

Figure 12:
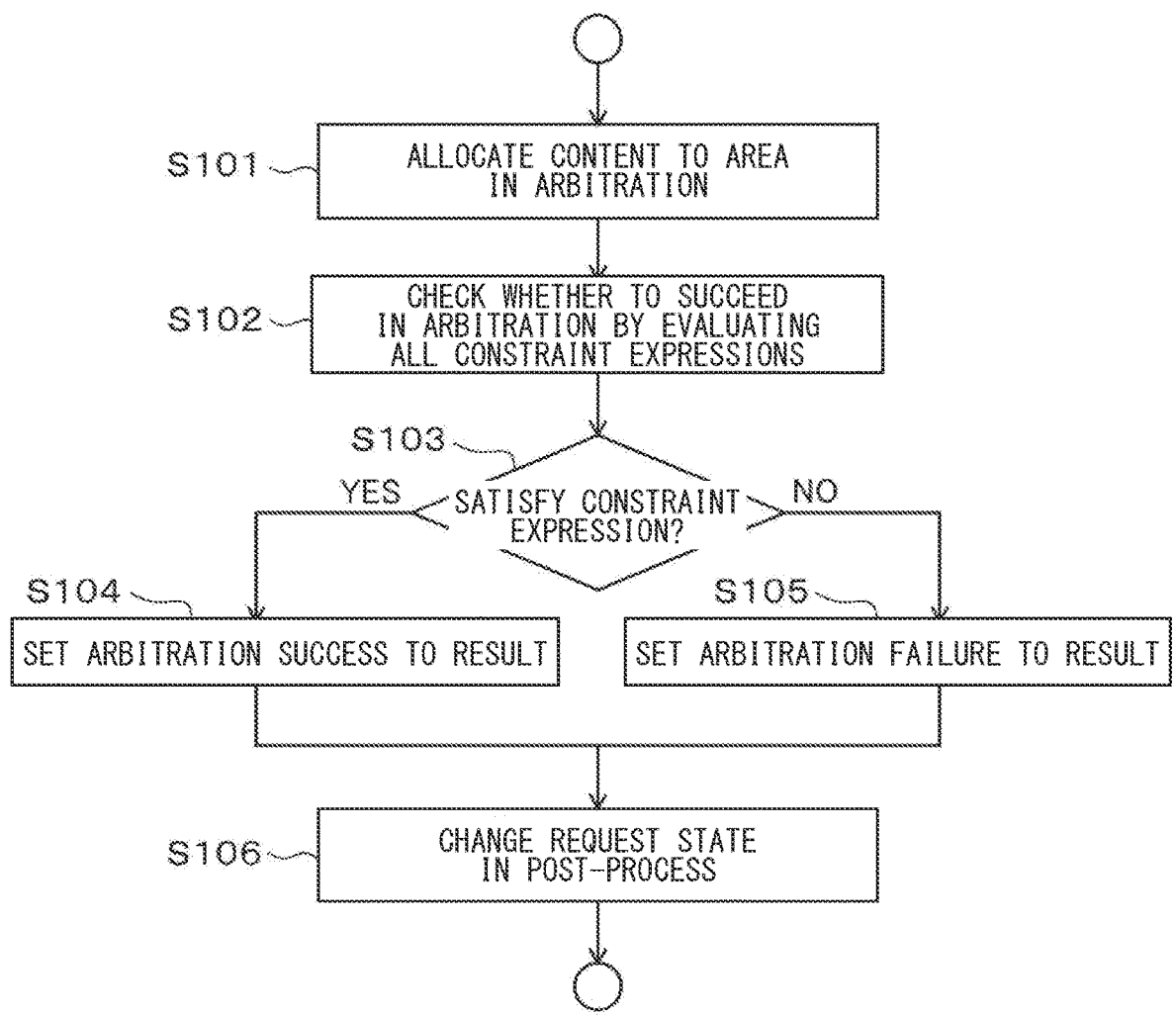
FIG. 12 is a flowchart showing a behavior of an arbitration logic as a whole.

As shown in FIG. 12, after performing arbitration process and allocating content to the area (S101), all constraint expressions are evaluated to determine whether the arbitration process has succeeded (S102). If it has succeeded (S103: YES), the result is set to successful arbitration, and the allocation is fixed (i.e., settled) (S104). When it has failed (S103: NO), arbitration failure is set in the result (S105). Then, the post-processing is performed to change the request state (S106).

(b) Operation of Arbitration Process

Figure 13:
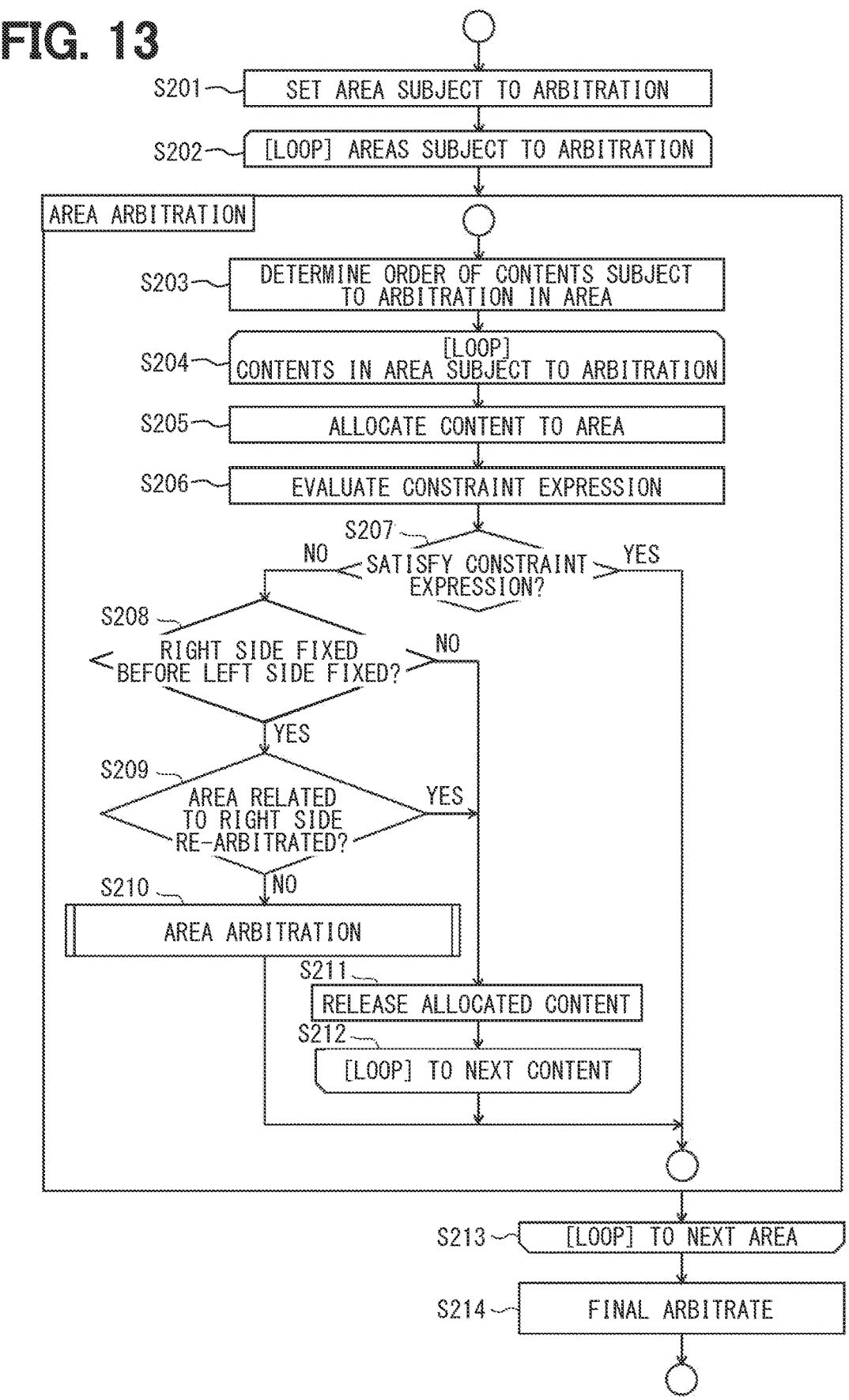
FIG. 13 is a flowchart showing an operation of an arbitration process.

As shown in FIG. 13, after the areas subject to arbitration are arranged in descending order of priority (S201), if there is an area subject to arbitration (S202), the process proceeds to an arbitration in area. In the arbitration of area, the arbitration order of the content in the area is determined based on the arbitration policy (S203). No that when there is no area subject to arbitration, the loop ends.

If there is a content subject to arbitration in the area (S204, loop end condition), such a content is provisionally allocated to the area (S205). Note that there is no content subject to arbitration, the loop ends.

Next, after evaluating the constraint expression (S206), it is determined whether or not the constraint expression is satisfied (S207). If the constraint expression is satisfied (S207: YES), the arbitration in the area is exited. If not satisfied (S207: NO), it is determined whether there is a case in which the right side of the implication has already been determined and the left side is determined next (S208). If there is such a case (S208: YES), it is determined whether the area related to the right side of the implication has already been re-arbitrated (S209). If there is not such a case (S208: NO), the provisional allocation of the content is released (S211). Then the process moves to the next content subject to arbitration in the area (S212), and the arbitration in the area is exited.

On the other hand, if it has not been re-arbitrated (S209: NO), the area related to the right side in the implication is added in the order next to the area subject to arbitration (S210). If it has been re-arbitrated (S209: YES), the provisional allocation of the content is released (S211). Then the process shifts to the next content subject to arbitration in the area (S212). When the loop of shifting to the next content subject to arbitration in the area is completed and there are no more areas subject to arbitration (S213), finally all areas are arbitrated only once without being re-arbitrated (S214).

3. APP Request

Figure 14:
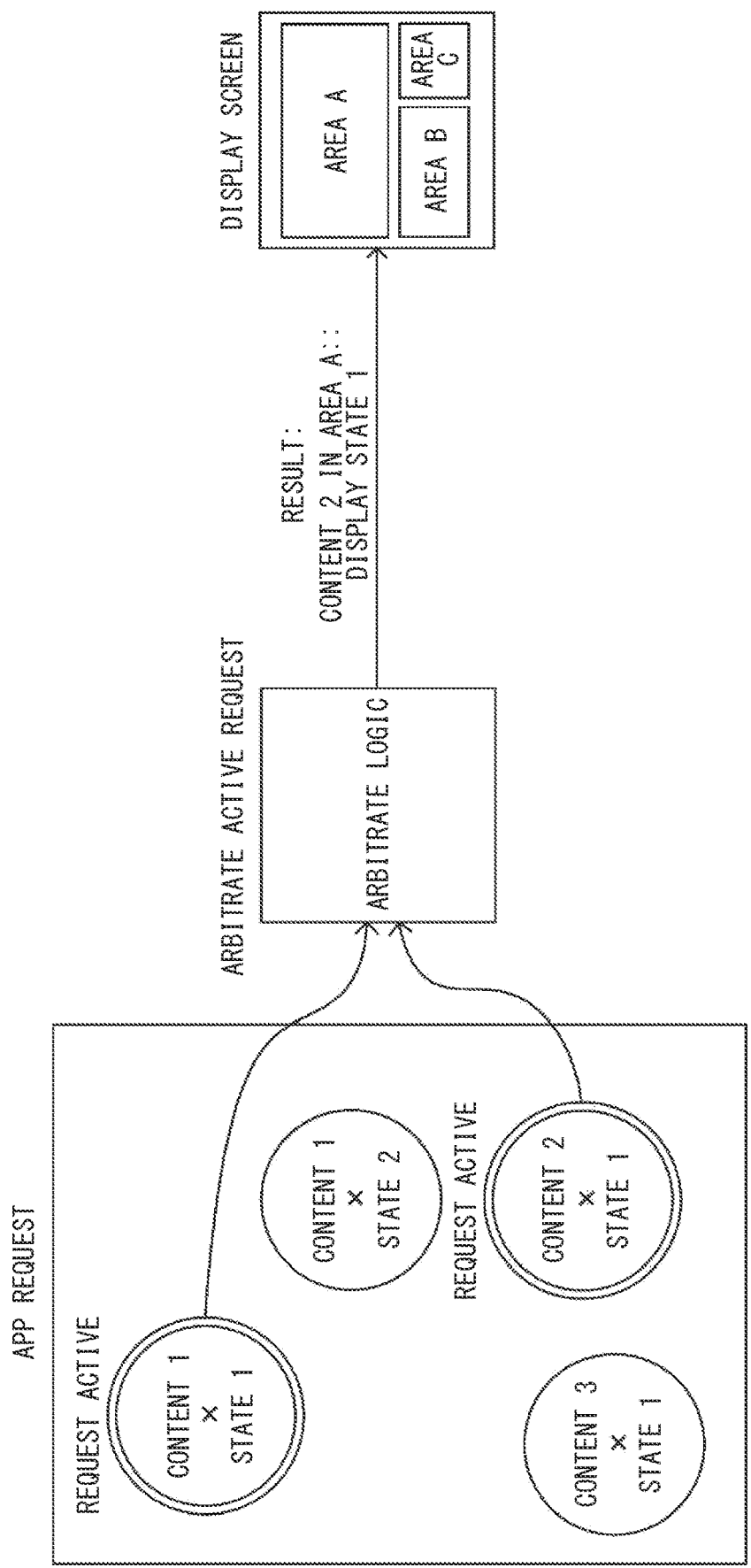
FIG. 14 is a diagram showing a concept of an APP request.

The APP request passes the value of content×state to the arbitration logic as a request from the application, as shown in FIG. 14. Requests do not come at the same time, and always come in order. It is also affected by post-processing that changes the state of the request after arbitration. The arbitration logic arbitrates the content (and state) for which the APP request has been issued. Therefore, at least an APP request for the displayed content must have been issued.

The APP request is a request for a content. When an APP request occurs, the content corresponding to the APP request is arbitrated. Then, after the constraint expression is satisfied, the content is displayed in the area. Specifically, upon an APP request being issued, areas subject to arbitration are selected in descending order of priority of areas. Next, arbitration is performed according to the arbitration policy of each area. In other words, the content list is sorted according to the arbitration policy, in the order of priority for priority arbitration and in the order of post-win for post-win arbitration.

Next, the content of the content list is compared with the constraint expression to determine whether or not the content is displayable. Content that is not displayed is removed from the list. That is, the content is allocated and the constraint expression is then evaluated. In this case, the constraint expression is an evaluation, not a comparison, so if all are true, the content allocation is OK. Suppose a case where the constraint expression evaluation is false and content allocation is not permitted. Such a case may be not what was intended; thus, the re-arbitration is performed. Next, display areas are allocated in the order of the sorted content list, and the above process is repeated until there is no area subject to arbitration.

The content list is sorted before it is allocated to each area. The content list is created prior to each area allocation. Here, the content enabled to be displayed is determined for each area. Therefore, the content list is filtered by sorting and constraint expressions each time before area allocation. That is, it is determined whether the area can be allocated.

Figure 15:
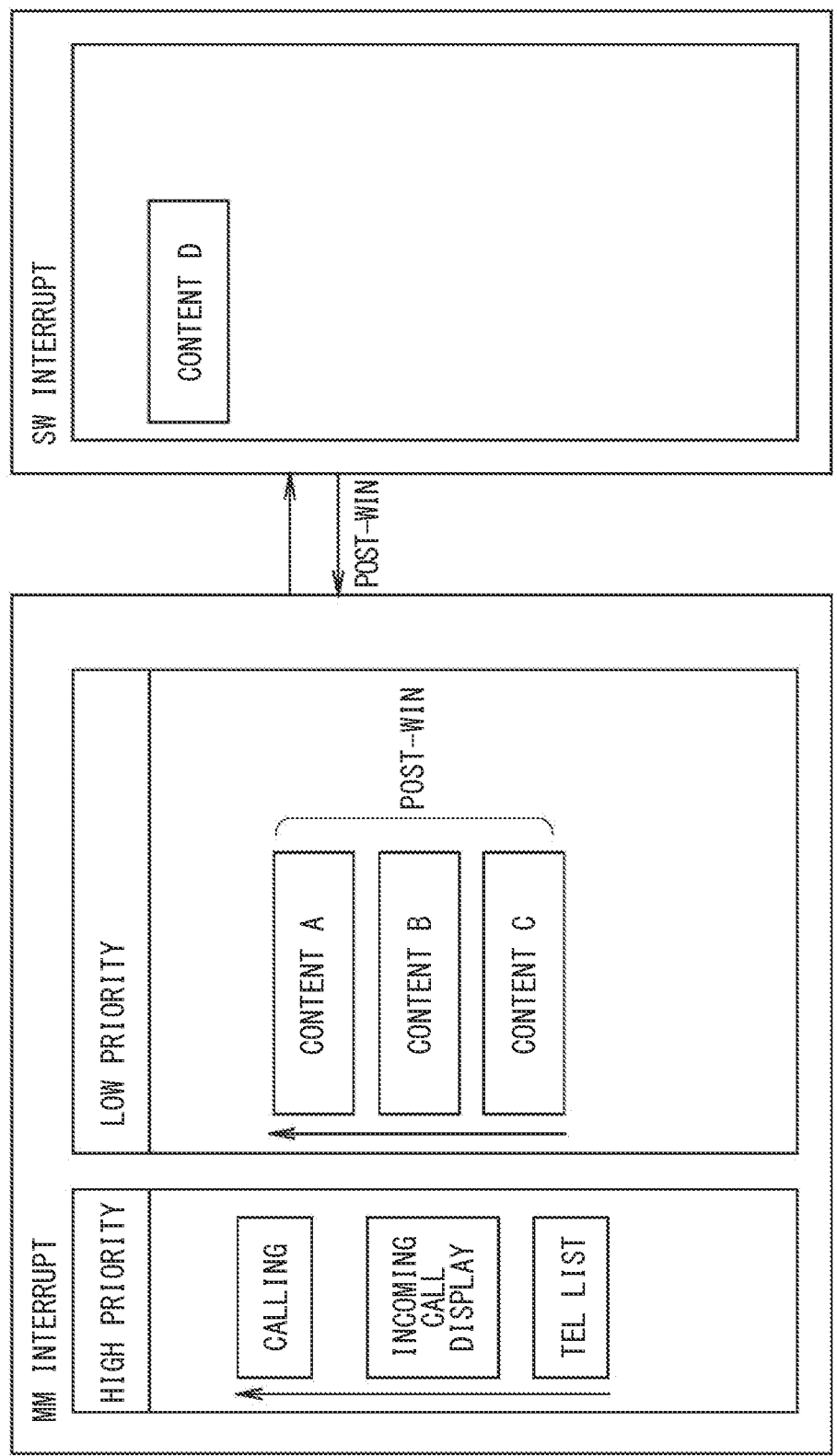
FIG. 15 is a diagram for explaining a case where a content is allocated to one area.

Next, a case of arbitrating the content that has been allocated to one area will be described. As shown in FIG. 15, (i) a multimedia (MM) type interrupt and (ii) a switch (SW) operation type APP request interrupt are assumed. When the post-win arbitration and the priority arbitration coexist, the post-win arbitration is basically prioritized, but TEL is prioritized among the MM type interrupts.

The constraint expression exemplifies "TEL.isActive( )->ForAllMM type interrupt (other than TEL) {x|!x.isVisible( )}". This is a constraint that all MM type interrupts (other than TEL) are not displayed if TEL is active. The TEL content can have three states of "calling", "incoming call display", and "TEL list", and the priority is changed in each state. The priority of the contents having a low priority is content A>content B>content C.

Here, the content suppression is that an interrupt is not notified during normal display of content C. The constraint expression exemplifies "center.displayingContent( )=C.->!C notification.isVisible( )". This is a constraint that the notification of content C is not displayed if the content C is displayed in the central display area. As described above, it is possible to display the content intended by the writer in one area.

Figure 16:
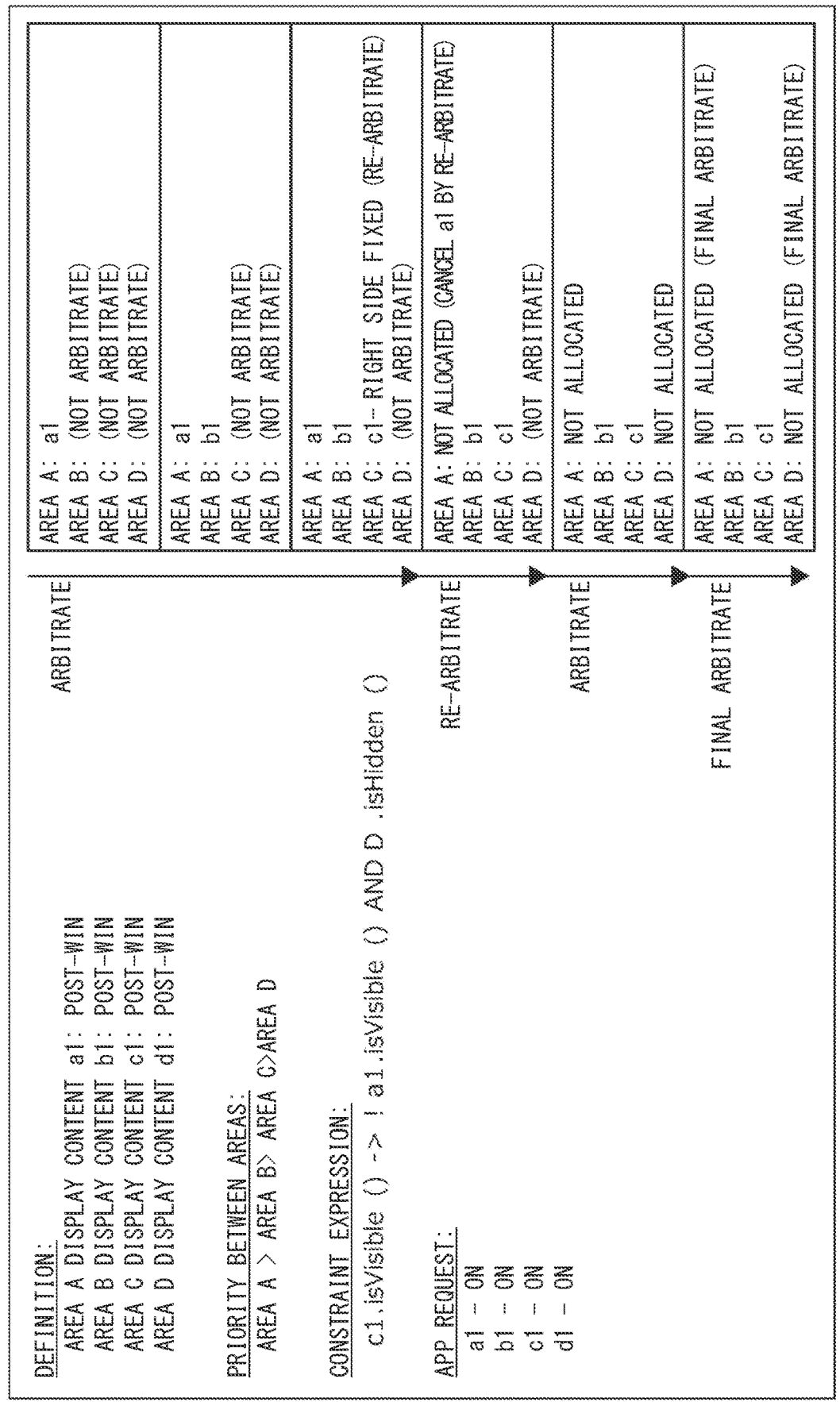
FIG. 16 is a diagram for explaining a case where contents are allocated to a plurality of areas.

The following will describe a case of arbitrating the contents allocated to a plurality of areas. As shown in FIG. 16, the area A can display the content a1, the area B can display the content b1, the area C can display the content c1, and the area D can display the content d1, which are all post-win arbitration policies. The priority of the areas is area A>area B>area C>area D.

Figure 17:
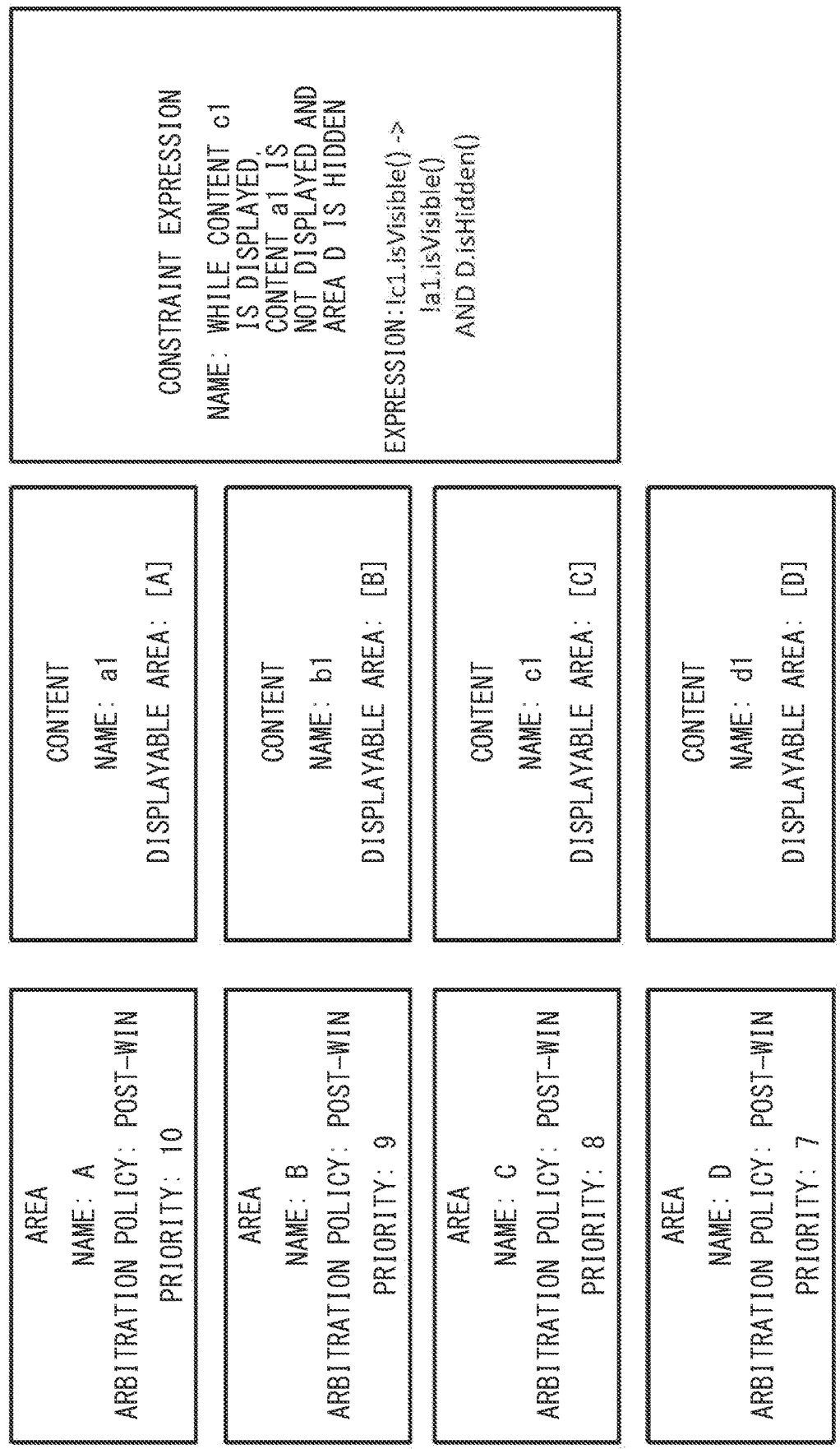
FIG. 17 is a diagram showing definitions of areas, contents, and a constraint expression.

The definitions of area, content and constraint expression will be explained. As shown in FIG. 17, a name, an arbitration policy, and a priority are set for each area. In addition, a name and a displayable area are set for each content.

The constraint expression exemplifies c1.isVisible( )->!a1.isVisible( ) ANDD.isHidden( ). IsHidden( ) means that the area is not displayed even if there is a content that can be allocated to the area. This constraint expression describes suppression in which the content a1 is not displayed while the content c1 (that is, the area C) is being displayed, and the area D (which interferes with the area C) is hidden.

When the APP request is turned on in the order of content a1, content b1, content c1, and content d1, the arbitration is performed in order from area A. Although the content a1 is allocated to the area A according to the arbitration policy, the constraint expression cannot be determined, so the content a1 is provisionally allocated. Similarly, the content b1 is provisionally allocated to the area B.

Now, in the arbitration in the area C, the content c1 is allocated to the area C according to the arbitration policy, but the right side of the implication in the constraint expression is a false determination first. In other words, the AND operator is always false if one is false.

Therefore, re-arbitration is performed in a state where the content c1 is provisionally allocated to the area C. The re-arbitration is performed so that the evaluation result of the constraint expression in the area A becomes true. There are two result patterns for which the evaluation result of the constraint expression is true. In the result pattern 1, when the content c1 is displayed, the content a1 is not displayed and the area D is hidden. In the result pattern 2, if the content c1 is not displayed, the evaluation result of the constraint expression is true. Although the result pattern 1 is as intended by the writer, the result pattern 2 is highly likely to not reflect the writer's intention.

This case corresponds to the case where the right side of the implication is determined first and the left side is thereafter determined. Thus, the re-arbitration is performed. Allocating the content c1 to the area C is regarded as being correct, and the re-arbitration is performed in the area on the right side. After the re-arbitration, it returns to the original arbitration order and arbitrates the unarbitrated area D. In this case, in order for the right side of the constraint expression to be true, the area D needs to be hidden (unallocated). After that, the arbitration is finally performed only once without re-arbitration. This arbitration is executed mainly for unallocated areas. As described above, it is possible to display the contents intended by the writer for a plurality of areas.

According to such an embodiment, the following effects can be obtained. In a display control apparatus 10, the followings are operated. An APP request to display a first content in an area is issued from an application. In this case, if a second content of another application is displayed in the area indicated by the APP request, an arbitration is performed to allocate a content to the area by the arbitration policy of the rule-based arbitration. The content allocated to the area is thereby displayed in the area.

Here, depending on the situation such as the traveling state of the vehicle, it may be better not to display the content even when the content is allocated by the arbitration policy. Therefore, a rule is described which describes the properties that should be exceptionally satisfied in the rule definition (i.e., the rule-based definition). As a result, the display of the content allocated to the area in the arbitration policy can be suppressed based on the rule, and the intention of the writer can be appropriately reflected.

Here, a content with the highest priority is allocated provisionally to the area by the arbitration policy. If the rule is satisfied, the provisionally allocated content is fixed (i.e., settled). If the rule is not satisfied, the next highest value content is evaluated. If there is no content that satisfies the rule, any content is not allocated to the area. Therefore, it is possible to display the content with higher priority satisfying the rule in one area.

An arbitration is executed in order from the area with the higher priority. In this case, when it is not possible to determine whether or not the rule is satisfied, the content is provisionally allocated according to the arbitration policy. When an area that does not satisfy the rule occurs, a re-arbitration is executed. Such a re-arbitration is to allocate a content to an area that satisfies the rule from the area with the higher priority among the areas where the contents are provisionally allocated. Therefore, it is possible to display the contents with higher priority satisfying the rule for a plurality of areas.

In cases that the content allocated to an area is determined not to be displayed by the arbitration policy when re-arbitration is executed, the area is set as an unallocated area. If the arbitration is executed for all areas subject to arbitration, the final arbitration is executed for unallocated areas. Therefore, the result can be correctly reflected in the area affected by the area whose result is changed by the re-arbitration.

Since the arbitration policy is set for each area, it is possible to allocate a desired content for each area. It is thereby possible to reduce the complexity of content management as in a known.

A constraint expression is a logical expression defined by an operator. If the evaluation result of the logical expression is true, it is determined that the rule is satisfied. Therefore, various constraints can be logically described by a logical expression. If the left side of the implication of the logical expression is true and the right side is false, it is determined that the rule is not satisfied without making the left side false so that the evaluation result of the logical expression is true. Therefore, it is possible to reflect the intention of the writer.

Since the content is displayed in the area in one state selected from a plurality of states, the content can be displayed in various states. Since priority arbitration, post-win arbitration, and value-based arbitration can be set as arbitration policies, it is possible to set an appropriate arbitration policy corresponding to an area.

Other Embodiments

The re-arbitration of the content allocated to the area may be executed a plurality of times. It may be applied to a display control apparatus other than that for vehicles.

Although the present disclosure has been made in accordance with the embodiments, it is understood that the present disclosure is not limited to such embodiments and structures. The present disclosure encompasses various modifications and variations within the scope of equivalents. Additionally, various combinations and configurations, as well as other combinations and configurations including more, less, or only a single element, are within the scope and spirit of the present disclosure.

For reference to further explain features of the present disclosure, the description is added as follows.

For example, the contents displayed on a display device installed in a vehicle is diverse. Examples of these contents include traveling system contents related to vehicle traveling and multimedia contents not related to the vehicle traveling. For example, traveling system contents related to vehicle traveling include vehicle speed, engine speed, shift position, and remaining amount of fuel. For example, multimedia contents include map information for navigation, audio information, and mobile phones.

Due to diversification of the displayed contents, various display devices for displaying the contents are mounted in vehicles. The various display devices include, for example, a head-up display, a graphic meter, a center display placed on a center console, or the like.

The content is displayed in a predetermined area on the display device in response to a display request from an application. When an application issues a display request to request to display a content in an area, there may be a case where another content by another application is already displayed in the area. In such a case, a display arbitration control is required for arbitrating which content to be displayed.

An arbitration method is proposed in which an importance degree is allocated to each content and a content with a high importance degree is thereby displayed in an area. Such an arbitration method only performs basic arbitration. Therefore, for example, it is not possible to meet the exceptional request that the user does not want to display the arbitrated content in some situations such as the traveling state of the vehicle. Unintended content may thereby be displayed.

It is thus desired to provide a display control apparatus, a display control method, and a computer-readable storage medium that can prevent unintended content from being displayed in an area set on a display device.

An aspect of the present disclosure described herein is set forth in the following clauses.

According to an aspect of the present disclosure, an application issues a display request when displaying a content in an area set in a display device. Then, if a content by another application is being displayed in the area indicated by the display request, a content allocated to the area is determined according to an arbitration policy that defines a basic arbitration. The content allocated to the area is thereby displayed in the area.

There may be a case where a request arises to suppress displaying of the content allocated according to the arbitration policy. In such a case, a rule is described in a rule definition; the rule is to describe a property that should be exceptionally satisfied. This allows the content to be allocated to the area so as to satisfy the rule. This can suppress displaying of the content allocated to the area by the arbitration policy.

What is claimed is:

1. A display control apparatus comprising:
a storage configured to store a rule definition used to for a rule-based arbitration, the rule definition including an arbitration policy and a constraint expression, the arbitration policy defining a basic arbitration when allocating a content to an area set in a display device, and the constraint expression being a rule describing a property to be exceptionally satisfied;
an application configured to issue a display request to request to display the content in the area;
an arbitration unit configured to execute an arbitration that allocates the content to the area to satisfy the rule-based arbitration if a different content by a different application is displayed in the area indicated by the display request when the application issues the display request; and
a display controller unit configured to display the content, which is allocated to the area by the arbitration, in the area on the display device;
wherein:
the arbitration unit is configured to execute the arbitration so as to allocate a plurality of the contents to a plurality of the areas;
a value is set in each of the areas and each of the contents;
the arbitration unit is configured to execute the arbitration so as to allocate the plurality of the contents to the plurality of the areas, by allocating a highest-value content in order from a highest-value area, while excluding a content already allocated to another area;
the rule is a propositional logic including a left side and a right side; and
in response to the right side being fixed before the left side is fixed when executing the arbitration in order from a highest-value area, the arbitration unit is configured to re-execute the arbitration to allocate the content in the area related to the right side of the propositional logic.

2. The display control apparatus according to claim 1, wherein:
the arbitration unit is configured to execute the arbitration so as to allocate the content to one area as the area.

3. The display control apparatus according to claim 2, wherein:
the arbitration unit is configured to execute the arbitration so as to allocate the content to the one area, by
(i) provisionally allocating a highest-value content to the area according to the arbitration policy,
(ii) in response to the rule being satisfied, fixing the provisionally allocated content,
(iii) in response to the rule being unsatisfied, evaluating a second highest- value content, and
(iv) in response to no content satisfying the rule, unallocating the content to the area.

4. The display control apparatus according to claim 1, wherein:
in response to the content provisionally allocated to the area being determined not to be displayed by the arbitration policy when re-executing the arbitration, the arbitration unit is configured to set the area as an unallocated area; and when re-executing the arbitration to all the areas subject to re-executing the arbitration, the arbitration unit is configured to execute a final arbitration to the unallocated area.

5. The display control apparatus according to claim 1, wherein:
the rule-based arbitration is set for each area.

6. The display control apparatus according to claim 1, wherein:
the rule is a logical expression defined by an operator; and
the arbitration unit is configured to determine that the rule is satisfied when an evaluation result of the logical expression is true.

7. The display control apparatus according to claim 1, wherein:
the rule is a logical expression in which an operator is defined with an implication including a left side and a right side; and
when the left side of the implication is true and the right side is false, the arbitration unit determines that the rule is not satisfied, instead of making the left side false so as to make an evaluation result of the logical expression true.

8. The display control apparatus according to claim 1, wherein:
the content is defined as including a plurality of states; and
the display controller unit is configured to display the content in the area in one state selected from the plurality of states.

9. The display control apparatus according to claim 1, wherein
the arbitration policy is one of first to third arbitrations:
the first arbitration being a value arbitration set for each area, the value arbitration allocating a highest-value content;
the second arbitration being a post-win arbitration set for each area, the post-win arbitration allocating a content that is requested to be displayed by a display request issued by an application most recently;
the third arbitration being a value-based arbitration set for all areas, the value-based arbitration allocating a highest-value content.

10. A display control apparatus comprising:
a first storage configured to store a rule definition used to a rule-based arbitration, the rule definition including (i) an arbitration policy and (ii) a constraint expression, the arbitration policy defining a basic arbitration allocating and displaying a content with a highest value indicating a highest priority to an area set in a display device, and the constraint expression suppressing the content allocated by the arbitration policy from being displayed;
a second storage configured to store an application configured to issue a display request to request to display the content in the area; and
one or more processors coupled to the first storage and the second storage, the one or more processors being configured to
(i) cause the application to issue the display request,
(ii) in response to a different content by a different application being displayed in the area indicated by the display request when the application issues the display request, execute an arbitration based on the arbitration policy to provide an arbitration result,
(iii) in response to the arbitration result failing to satisfy the constraint expression, execute a re-arbitration to allocate the content to the area so as to satisfy the constraint expression, and (iv) displaying the content, which is allocated to the area by the re- arbitration, in the area on the display device.

11. The display control apparatus according to claim 10, wherein:
   in the arbitration policy, a value is set in each of the areas;
   the constraint expression is a logical expression in which an operator is defined with an implication including a left side and a right side;
   in response to the different content being displayed in the area, the one or more processors are configured to execute the arbitration based on the arbitration policy in order from a highest-value area to provide the arbitration result; and
   in response to the right side being fixed before the left side is fixed in the implication in cases an evaluation result of the logical expression is false due to the arbitration result failing to satisfy the constraint expression, the one or more processors are configured to execute the re-arbitration in one of the areas related to the right side of the propositional logic.

12. The display control apparatus according to claim 10, wherein:
   the display control apparatus is mounted in a vehicle; and
   the constraint expression suppresses the content allocated by the arbitration policy from being displayed based on at least one of the content, the area, and a scene in the vehicle.

13. The display control apparatus according to claim 10, wherein:
   the constraint expression is to meet an exceptional request not to want to display the content allocated by the basic arbitration.

14. A display control apparatus comprising:
   a storage configured to store a rule definition used to for a rule-based arbitration, the rule definition including an arbitration policy and a constraint expression, the arbitration policy defining a basic arbitration when allocating a content to an area set in a display device, and the constraint expression being a rule describing a property to be exceptionally satisfied;
   an application configured to issue a display request to request to display the content in the area;
   an arbitration unit configured to execute an arbitration that allocates the content to the area to satisfy the rule-based arbitration if a different content by a different application is displayed in the area indicated by the display request when the application issues the display request; and
   a display controller unit configured to display the content, which is allocated to the area by the arbitration, in the area on the display device;
   wherein:
   the rule is a logical expression in which an operator is defined with an implication including a left side and a right side; and
   when the left side of the implication is true and the right side is false, the arbitration unit determines that the rule is not satisfied, instead of making the left side false so as to make an evaluation result of the logical expression true.

\* \* \* \* \*